Figure 1:
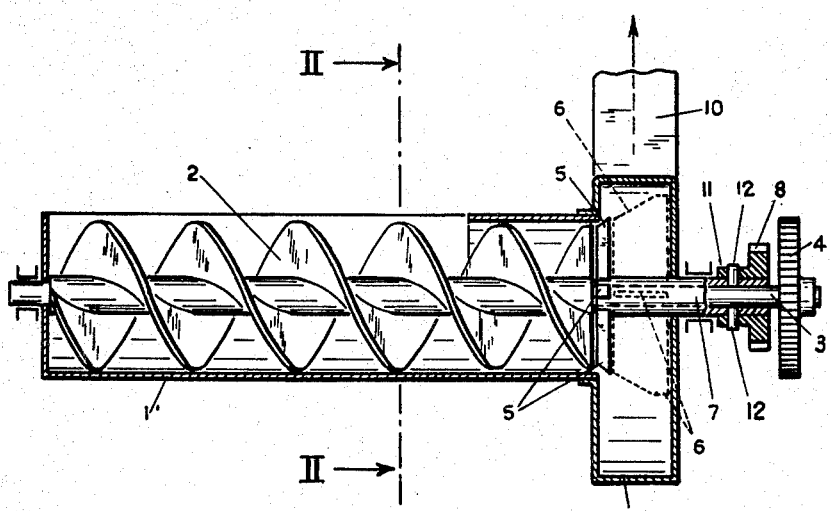

April 6, 1965  H. VISSERS  3,176,738
APPARATUS FOR BRUISING GREEN FODDER
Filed Sept. 21, 1962

INVENTOR
HERBERT VISSERS

BY

ATTORNEYS

United States Patent Office 3,176,738
Patented Apr. 6, 1965

3,176,738
APPARATUS FOR BRUISING GREEN FODDER
Herbert Vissers, Nieuw Vennep, Netherlands, assignor to Landbouwwerktuigen- en Machinefabriek H. Vissers N.V., Nieuw Vennep, Netherlands
Filed Sept. 21, 1962, Ser. No. 225,291
Claims priority, application Netherlands, Sept. 25, 1961, 269,551
2 Claims. (Cl. 146—107)

This invention relates to an apparatus for bruising green fodder, provided with a substantially horizontal trough-shaped casing for receiving the material to be treated and with a conveyor screw having a constant or nearly constant pitch and mounted for rotation in said casing, and discharge means being connected to said casing.

Apparatus of this type are used for bruising grass and similar material to be ensiled. With the hitherto known apparatus a stationary grid is provided at the discharge opening of the casing and may be combined with a set of knives, so that the stalks are not only bruised but also cut into pieces. As the conveyor screw has to force the material through the grid the screw requires relatively much power.

The invention has for its object to decrease the power consumption of the screws and to still promote the bruising of the stalks. According to the invention a set of beating bars is arranged at the discharge end of the casing between the screw and the discharge means and is mounted for rotation about an axis in alignment with that of the conveyor screw but with a much larger speed than the screw. As said beating bars move closely along the ends of the helical ribs of the screw they will grasp the stalks and disintegrate same, so that the cells are opened and juice will be freed.

As the screw and the shaft of the beating bars are in alignment the shaft of the screw covers the inoperative central part of the set of beating bars so that the stalks are prevented from being wound around the shaft of the bars.

When a bladed impeller is used as discharge means having its axis in alignment with the axis of the screw the beating bars may be united with the blades.

For varying the bruising action of the beating bars the axial distance of the bars with respect to the end of the ribs of the screw may be adjustable.

The invention will further be described with reference to the accompanying drawing showing in FIG. 1 a sectional elevation of an embodiment of an apparatus according to the invention take on line I—I of FIG. 2, said latter being a sectional view taken on line II—II of FIG. 1.

A conveyor screw 2 which preferably is provided with two or more helical ribs is rotatably mounted in a trough-shaped casing 1 which is open at its top or at its front. Said screw may have a constant pitch as the screw need not to exert a pressing action and only conveys the grass or like material. A driving wheel 4 is secured to the shaft 3 of the screw.

At the discharge end of the screw 2 a set of beating bars 5 is mounted for rotation and each of said bars may be united with a blade 6 of an impeller. The beating bars 5 are secured to a hollow shaft 7 carrying a driving wheel 8. When providing such a impeller as shown in the drawing in dotted lines said impeller is surrounded by a spiral casing 9 to which a conveying duct 10 may be connected.

The grass to be bruised may be taken up from the ground and directly be supplied into the casing 1 by pick-up conveyor means and in said casing the grass is axially conveyed by the screw in order to come within the reach of the beating bars 5 and to be discharged into the conduit 10 by the air flow generated by the impeller blades 6.

The number of revolutions of the beating bars 5 is a multiple e.g. a sixfold of that of the conveyor screw 2 and the bars 5 may rotated in the same direction as the screw or in opposite direction.

In order to prevent the screw 2 from obtaining the speed of the beating bars 5 when a foreign bory, such as a stone, is jammed between the bars and the screw the hub 11 of the driving wheel 8 is connected to shaft 7 by means of one or more shear pins 12, so that upon rupture of said bolts the speed of bars 5 will be limited to that of the screw.

Figure 2:
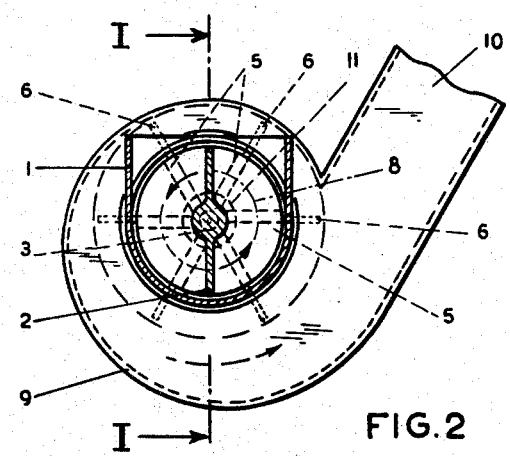

As appears from FIG. 1 of the drawing the beating bars 5 closely move along the ribs of the screw 2. The axial distance between the ribs of the screw and the bars 5 may also be larger and be adjusted e.g. by axial displacement of the hollow shaft 7 of the bars 5.

The apparatus shown in the drawing may be mounted on a frame having ground wheels and forming part of a grass loading implement.

What I claim is:

1. An apparatus for bruising green fodder, comprising a trough-shaped casing for receiving the material to be treated, a conveyor screw having a helical rib mounted for rotation about an axis in said casing, means for rotating said screw at a given speed, a housing connected to the discharge end of said casing, discharge means in said housing, a smooth unobstructed circular opening between said casing and said housing, a set of beating bars devoid of cutting edges and arranged at the discharge end of the casing close to the end of the helical rib of the screw but spaced slightly from the rib end to avoid any shearing action, said set of beating bars being mounted for rotation about an axis in alignment with said axis of the conveyor screw, and means for rotating said set of beating bars at a much greater speed than the screw.

2. An apparatus for bruising green fodder, comprising a trough-shaped casing for receiving the material to be treated, a conveyor screw having a helical rib mounted on a first shaft in said casing and terminating in a planar end face perpendicular to said shaft at one end thereof constituting the discharge end of the screw, means for rotating said first shaft at a given speed, a housing connected to the discharge end of said casing, an impeller in said housing mounted on a second shaft having substantially the same diameter as and in alignment with the first shaft, a circular unobstructed opening between said casing and said housing, a set of beating bars devoid of cutting edges arranged on said second shaft between the screw and the impeller and close to but spaced from said planar end face of the screw rib to avoid any shearing action, and means for rotating the set of beating bars and second shaft at a much higher speed than that of the screw.

References Cited by the Examiner
UNITED STATES PATENTS

| | | |
|---|---|---|
| 1,697,925 | 1/28 | McKay. |
| 2,496,493 | 2/50 | Raney _____ 56—505 X |
| 2,701,595 | 2/55 | Berger et al. |
| 2,847,811 | 8/58 | Martin et al. |

J. SPENCER OVERHOLSER, Primary Examiner.
LOUIS J. CAPOZI, Examiner.